(12) United States Patent
Kubota et al.

(10) Patent No.: US 11,894,727 B2
(45) Date of Patent: Feb. 6, 2024

(54) ROTOR AND ROTATING ELECTRIC MACHINE

(71) Applicant: HONDA MOTOR CO., LTD., Tokyo (JP)

(72) Inventors: Yoshihisa Kubota, Wako (JP); Teppei Matsumoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 108 days.

(21) Appl. No.: 17/673,892

(22) Filed: Feb. 17, 2022

(65) Prior Publication Data

US 2022/0294291 A1    Sep. 15, 2022

(30) Foreign Application Priority Data

Mar. 12, 2021 (JP) ................. 2021-040709

(51) Int. Cl.
*H02K 1/28* (2006.01)
*H02K 1/27* (2022.01)
*H02K 1/276* (2022.01)

(52) U.S. Cl.
CPC .............. *H02K 1/28* (2013.01); *H02K 1/276* (2013.01)

(58) Field of Classification Search
CPC ........ H02K 1/28; H02K 1/276; H02K 1/2766; H02K 1/16; H02K 1/22; H02K 2201/09
See application file for complete search history.

(56) References Cited

U.S. PATENT DOCUMENTS

| 2001/0017499 A1* | 8/2001 | Kaneko | H02K 1/2766 310/156.28 |
| 2005/0001503 A1* | 1/2005 | Hans | H02K 1/2766 310/156.53 |
| 2016/0294262 A1* | 10/2016 | Yomoda | H02K 15/03 |

FOREIGN PATENT DOCUMENTS

JP    6319973    5/2018

* cited by examiner

*Primary Examiner* — Thomas Truong
(74) *Attorney, Agent, or Firm* — Amin, Turocy & Watson, LLP

(57) ABSTRACT

A rotor of the present invention includes a rotor core in which a shaft through-hole and a magnet insertion hole that form a plurality of layers in a radial direction toward a central axis of the shaft through-hole are formed, and a magnet press-fitted into the magnet insertion hole, and the rotor core includes a reinforcement part between the shaft through-hole and a first magnet insertion hole disposed on outermost side in the radial direction.

9 Claims, 4 Drawing Sheets

ROTOR AND ROTATING ELECTRIC MACHINE

CROSS-REFERENCE TO RELATED APPLICATION

Priority is claimed on Japanese Patent Application No. 2021-040709, filed Mar. 12, 2021, the content of which is incorporated herein by reference.

BACKGROUND OF THE INVENTION

Field of the Invention

The present invention relates to a rotor and a rotating electric machine.

Description of Related Art

A magnet-embedded rotating electric machine (a so-called interior permanent magnet (IPM) motor) having a rotor core in which a permanent magnet is embedded is known. In a rotor used in a magnet-embedded rotating electric machine, in order to increase a rotation speed, various structures in which a magnet insertion hole that forms a plurality of layers in a radial direction is provided in a rotor core and a magnet is inserted into the magnet insertion hole have been proposed.

For example, Japanese Patent No. 6319973 discloses a configuration in which a plurality of magnet embedding holes have a magnet embedding hole at an outer circumferential side located on an outer circumferential side of a rotator core (rotor core), and a magnet embedding hole at an inner circumferential side located on a central side of the rotator core.

SUMMARY OF THE INVENTION

In a structure in which a magnet insertion hole that forms a plurality of layers in a radial direction is provided in a rotor core and a magnet is inserted into the magnet insertion hole, since the magnet is inserted to an inward side of the rotor core in the radial direction, a rotor becomes heavy. As the rotor becomes heavier, since a centrifugal force acting on the rotor increases, it is desirable to improve a strength of the rotor.

An aspect of the present invention is directed to providing a rotor and a rotating electric machine in which a strength is able to be improved and which can be used stably even upon high speed rotation.

(1) A rotor according to an aspect of the present invention includes a rotor core in which a shaft through-hole and a magnet insertion hole that form a plurality of layers in a radial direction toward a central axis of the shaft through-hole are formed; and a magnet press-fitted into the magnet insertion hole, wherein the rotor core includes a reinforcement part between the shaft through-hole and a first magnet insertion hole disposed on outermost side in the radial direction.

(2) In the rotor according to the above-mentioned (1), the rotor core may have a weight reducing part passing through in an axial direction, and the reinforcement part may be disposed inside the weight reducing part.

(3) In the rotor according to the above-mentioned (2), the rotor core may have end surface plates on both end portions in the axial direction, and the reinforcement part may include a member that passes through the weight reducing part and that is fixed to the end surface plates.

(4) In the rotor according to the above-mentioned (1), the reinforcement part may include a resin material.

(5) In the rotor according to the above-mentioned (1), among the magnet insertion hole that forms the plurality of layers, a pair of second magnet insertion holes located on an inward side of the first magnet insertion hole in the radial direction may be arranged in a circumferential direction to sandwich a center rib extending in the radial direction, and the reinforcement part may include the center rib.

(6) The rotor according to any one of the above-mentioned (1) to (5) may include a compression part configured to apply a load to the rotor core from an outward side in the radial direction toward an inward side in the radial direction.

(7) The rotor according to the above-mentioned (5) may include a compression part configured to apply a load to the rotor core from an outward side in the radial direction toward an inward side in the radial direction, and the reinforcement part may include a contact portion, with which the magnet comes into contact, when a load from the compression part is applied to the rotor core.

(8) In the rotor according to the above-mentioned (7), the rotor core may have a convex portion extending outward in the radial direction in a circumferential surface of the magnet insertion hole on an inward side in the radial direction, the convex portion may come into contact with one end portion of the magnet press-fitted into the second magnet insertion holes, and the contact portion may come into contact with other end portion of the magnet press-fitted into the second magnet insertion holes.

(9) In the rotor according to the above-mentioned (8), the other end portion of the magnet and the center rib may be separated from each other.

(10) In the rotor according to any one of the above-mentioned (1) to (9), the magnet insertion hole may be provided in an arc shape protruding toward a central axis of the rotor core, and the magnet may be provided in an arc shape.

(11) A rotating electric machine according to another aspect of the present invention includes the rotor according to any one of the above-mentioned (1) to (10); and a stator disposed on an outward side in the radial direction from the rotor while having a gap therebetween.

In the configuration according to the above-mentioned (1), since the rotor core includes the reinforcement part, a strength of the rotor can be improved.

Accordingly, according to the configuration, it is possible to provide the rotor 4 capable of improving a strength and being stably used even upon high speed rotation.

In the configuration according to the above-mentioned (2), since the weight reducing part is provided in the rotor core, the weight of the rotor core can be reduced, and the rotor core can be stably used even upon high speed rotation of the rotor. In addition, since the reinforcement part is disposed in the weight reducing part, a strength of the rotor core can be improved.

In the configuration according to the above-mentioned (3), the reinforcement part is fixed by the end surface plates that sandwich both end portions of the rotor core in the axial direction. For this reason, a strength of the rotor core can be improved without exerting an influence on a magnetic field.

In the configuration according to the above-mentioned (4), the resin material is included in the reinforcement part. Since the magnet insertion hole or the weight reducing part is easily filled with the resin material, the rotor can be conveniently reinforced.

In the configuration according to the above-mentioned (5), the center rib is included in the reinforcement part. Since the strength of the rotor core can be improved by the center rib and the magnet can be supported by the center rib, the rotor is easily rotated at a high speed.

In the configuration according to the above-mentioned (6), the compression part configured to apply a load to the rotor core from the outward side in the radial direction toward the inward side in the radial direction is provided. High speed rotation of the rotor can be achieved by compressing the rotor core using the compression part while securing a strength of the rotor core by the reinforcement part.

In the configuration according to the above-mentioned (7), the reinforcement part includes the contact portion, with which the magnet comes in contact, when the load from the compression part is applied to the rotor core. In comparison with the case in which a magnet insertion hole with a small clearance from the magnet is provided in advance, work of inserting the magnet into the magnet insertion hole is facilitated. In addition, since compression deformation occurs between the rotor core and the contact portion due to the compression part, the magnet is fixed, and high speed rotation of the rotor is achieved.

In the configuration according to the above-mentioned (8), the convex portion comes in contact with the one end portion of the magnet press-fitted into the second magnet insertion holes. Since the convex portion comes in contact with one end portion of the magnet, a void can be provided between the outer circumferential surface of the second magnet insertion hole and the one end portion of the magnet, and the leakage magnetic field can be reduced in size.

In the configuration according to the above-mentioned (9), the other end portion of the magnet is separated from the center rib. That is, a void is provided between the other end portion of the magnet and the center rib. Since the void functions as a flux barrier, performance of the rotor can be improved.

In the configuration according to the above-mentioned (10), since the arc-shaped magnet is provided, in comparison with the case in which a linear magnet is provided, the thickness of the center rib in the circumferential direction can be relatively reduced. In addition, since the arc-shaped magnet is used, there is an advantage that the magnet is not crushed by a centrifugal force.

In the configuration according to the above-mentioned (11), since the rotor core included in the rotating electric machine includes the reinforcement part, a strength of the rotor can be improved.

Accordingly, according to the configuration, it is possible to provide the rotating electric machine capable of improving a strength and being stably used even upon high speed rotation.

Hereinabove, according to the aspect of the present invention, it is possible to provide a rotor and a rotating electric machine that are capable of improving a strength and being stably used even upon high speed rotation.

DETAILED DESCRIPTION OF THE INVENTION

Hereinafter, an embodiment of the present invention will be described with reference to the accompanying drawings. In the embodiment, a rotating electric machine mounted on a vehicle such as a hybrid automobile, an electric automobile, or the like, will be exemplarily described.

<Rotating Electric Machine>

Figure 1:
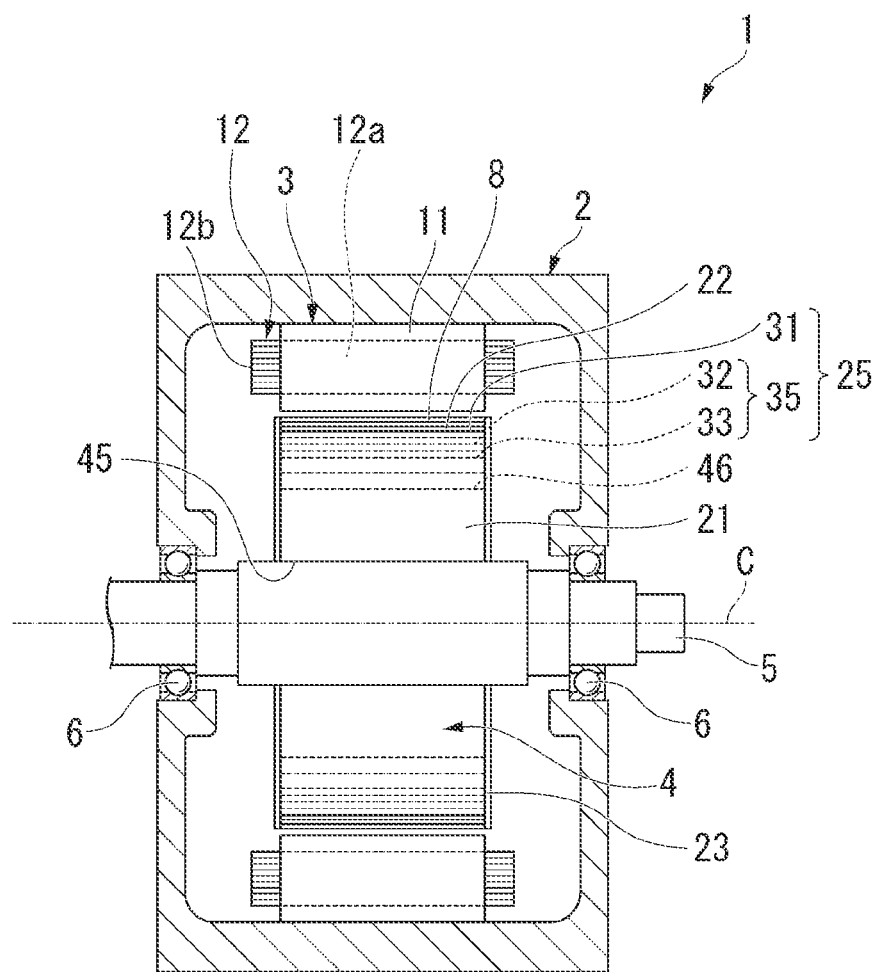
FIG. 1 is a cross-sectional view of a rotating electric machine according to an embodiment of the present invention.

FIG. 1 is a schematic configuration view showing the entire configuration of a rotating electric machine 1 according to an embodiment. FIG. 1 is a view including a cross section cut by a virtual plane including an axis C.

As shown in FIG. 1, the rotating electric machine 1 includes a case 2, a stator 3, a rotor 4, and a shaft 5.

The case 2 is formed in a cylindrical box shape in which the stator 3 and the rotor 4 are accommodated. A coolant (not shown) is accommodated in the case 2. A part of the stator 3 is immersed in the coolant in the case 2. For example, as the coolant, an automatic transmission fluid (ATF) or the like that is a working fluid used for lubrication of a transmission, power transmission, or the like, is used.

The shaft 5 is rotatably supported by the case 2. The shaft 5 is rotatably supported with respect to the case 2 via a bearing 6 attached to the case 2. Hereinafter, a direction along the axis C of the shaft 5 is referred to as "an axial direction," a direction perpendicular to the axis C is referred to as "a radial direction," and a direction around the axis C is referred to as "a circumferential direction."

The stator 3 includes a stator core 11, and coils 12 that has a plurality of layers and that is mounted on the stator core 11.

The stator core 11 is formed in an annular shape disposed coaxially with the axis C. The stator core 11 is fixed to an inner circumferential surface of the case 2. For example, the stator core 11 is formed by stacking a plurality of electromagnetic steel plates (silicon steel plates) in an axial direction. Further, the stator core 11 may a so-called powder core formed by compressing metal magnetic powder (soft magnetic powder).

The stator core 11 has slots 13 into which the coils 12 are inserted. The plurality of slots 13 are disposed at intervals in the circumferential direction. The coils 12 include insertion portions 12a inserted through the slots 13 of the stator core 11, and coil end portions 12b protruding from the stator core 11 in the axial direction. The stator core 11 generates a magnetic field as current flows to the coils 12.

<Rotor>

The rotor 4 is disposed with respect to the stator 3 on an inward side in the radial direction while having an interval there between. The rotor 4 is fixed to the shaft 5. The rotor 4 is configured to be rotatably integrally with the shaft 5 around the axis C.

The rotor 4 includes a rotor core 21, a magnet 22, an end surface plate 23, and an annular member 8.

<Rotor Core>

The rotor core 21 is formed in an annular shape disposed coaxially with the axis C. The shaft 5 is press-fitted and fixed to the rotor core 21 on an inward side in the radial direction. The rotor core 21 is formed by stacking a plurality of electromagnetic steel plates (silicon steel plates) in the axial direction. Further, the rotor core 21 may be a so-called powder core obtained by compressing metal magnetic powder (soft magnetic powder).

The rotor core 21 has a plurality of magnet insertion holes 25 passing through the rotor core 21 in the axial direction, an end rib 40, a shaft through-hole 45, a weight reducing part 46, and a reinforcement part.

The plurality of magnet insertion holes 25 are disposed in an outer circumferential portion of the rotor core 21 at intervals in the circumferential direction.

Figure 2:
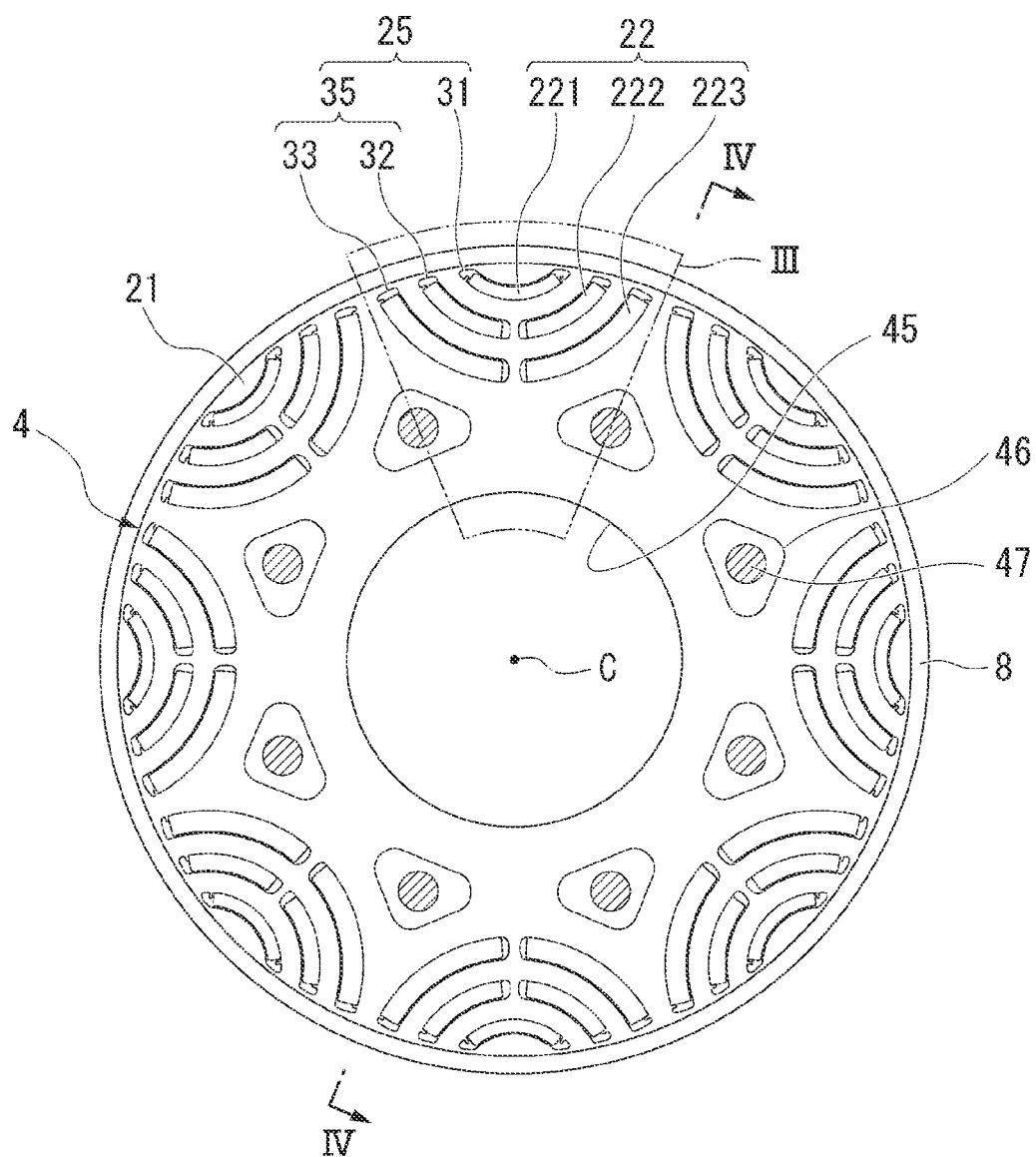
FIG. 2 is a front view of a rotor according to the embodiment of the present invention.
Figure 3:
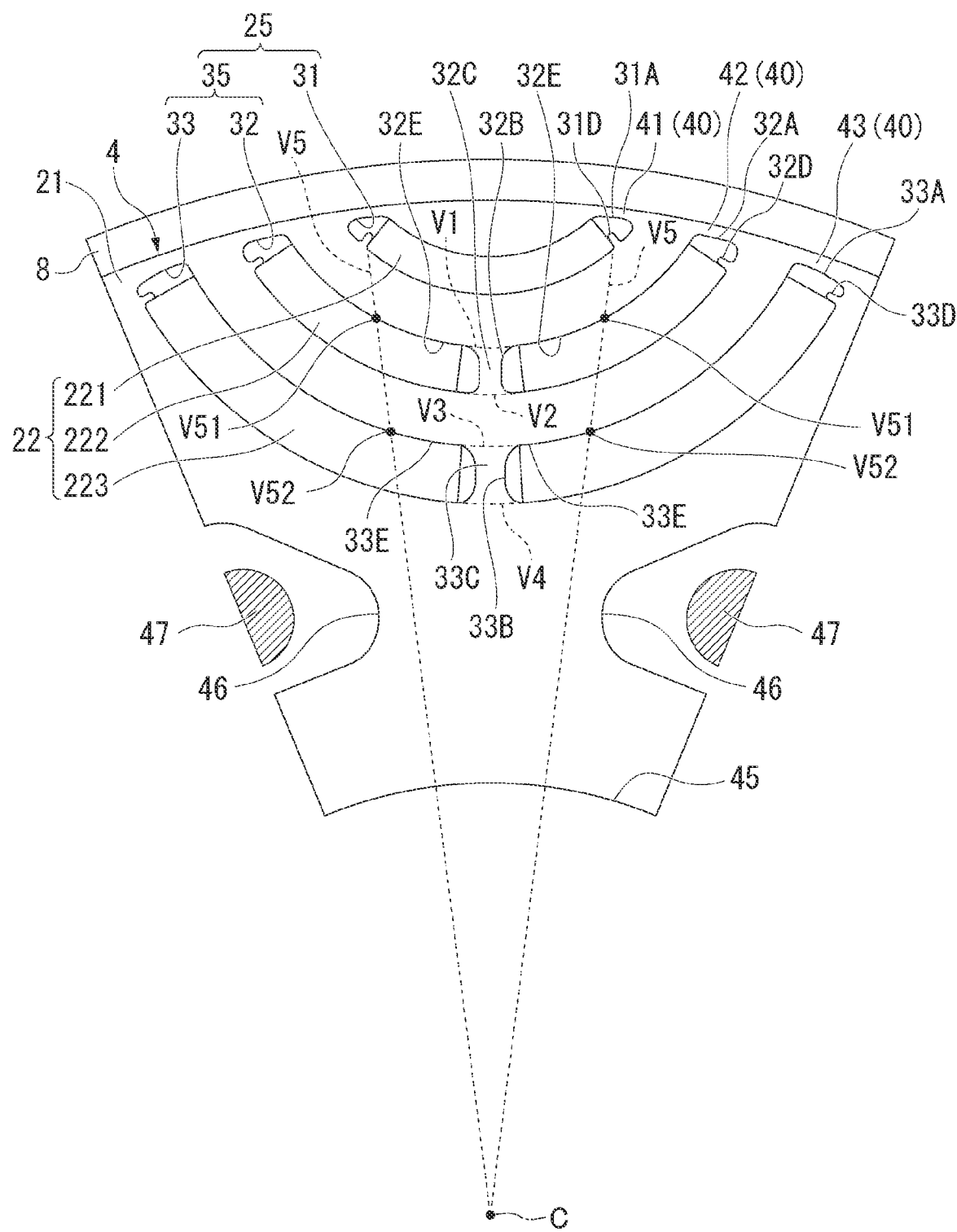
FIG. 3 is an enlarged view of a portion III in FIG. 2.
Figure 4:
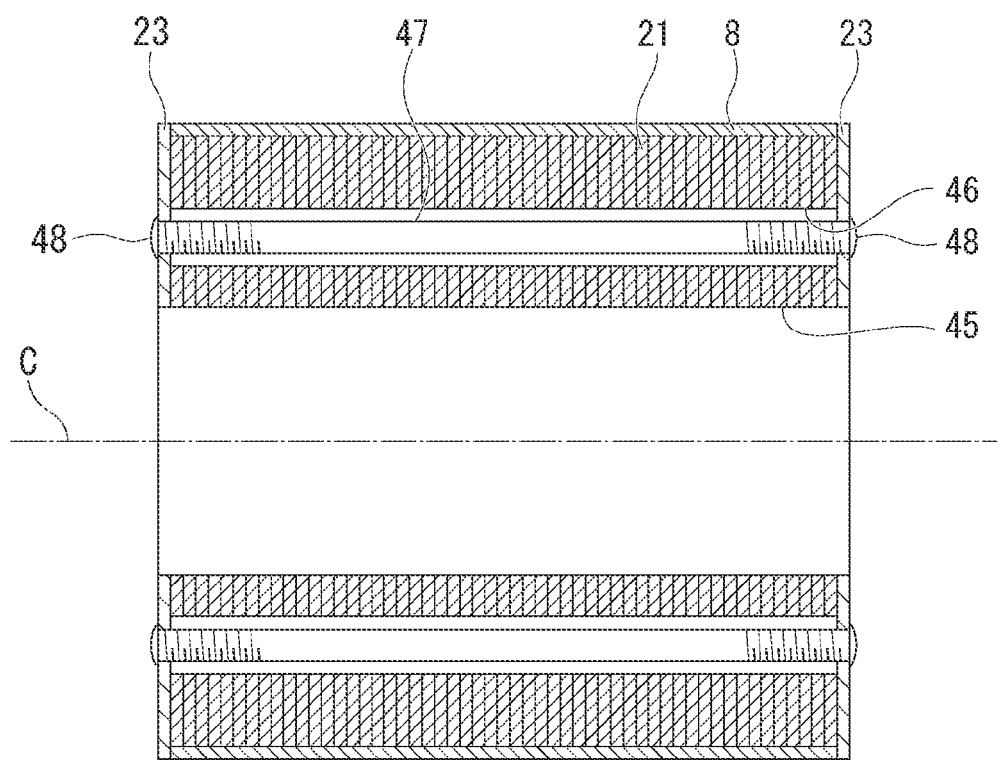
FIG. 4 is a cross-sectional view along line IV-IV in FIG. 2.

FIG. 2 is a view showing the rotor 4 according to the embodiment along an arrow II of FIG. 1 when seen in the axial direction. In FIG. 2, illustration of the shaft 5, the end surface plate 23, and the like, is omitted. FIG. 3 is an enlarged view of a portion III in FIG. 2. FIG. 4 is a cross-sectional view along line IV-IV in FIG. 2.

The plurality of magnet insertion holes 25 have a first magnet insertion hole 31 located on the outermost side in the radial direction, and a second magnet insertion hole 35 located on an inward side of the first magnet insertion hole 31 in the radial direction. The second magnet insertion hole 35 has outer second magnet insertion holes 32 and second inner magnet insertion holes 33. As shown in FIG. 2, in the embodiment, the magnet insertion holes 25 are provided for eight poles.

The first magnet insertion hole 31 is provided in an arc shape protruding toward a central axis of the rotor core 21 when seen in the axial direction. As shown in FIG. 3, both end portions of the first magnet insertion hole 31 are located on an inward side of the outer circumferential surface of the rotor core 21 in the radial direction. A first end portion 31A is provided on an outward side of the first magnet insertion hole 31 in the radial direction. The first end portion 31A smoothly connects an outer circumferential surface of the first magnet insertion hole 31 on an outward side in the radial direction, and an inner circumferential surface of the first magnet insertion hole 31 on an inward side in the radial direction.

First convex portions 31D are provided between the first end portion 31A and the inner circumferential surface of the first magnet insertion hole 31 on the inward side in the radial direction. Hereinafter, as shown in FIG. 3, a virtual line that connects inner end portions of the pair of first convex portions 31D in the circumferential direction and a central axis of the rotor core 21 is referred to as a virtual line V5.

The outer second magnet insertion holes 32 is provided on an inward side of the first magnet insertion hole 31 in the radial direction. The pair of outer second magnet insertion holes 32 are provided in the circumferential direction with a first center rib 32C extending in the radial direction sandwiched therebetween. The pair of outer second magnet insertion holes 32 are formed in an arc shape having the same curvature and arc center as the first magnet insertion hole 31 when seen in the axial direction.

In the end portions of the outer second magnet insertion holes 32, second outer end portions 32A are provided on one end portion on the outward side in the radial direction. In the end portions of the outer second magnet insertion holes 32, second inner end portions 32B are provided on the other end portion in the radial direction on the inward side. The first center rib 32C is provided on an inward side of the pair of second inner end portions 32B in the circumferential direction. Specifically, the first center rib 32C is provided between a virtual line V1 that connects outer circumferential surfaces of the pair of outer second magnet insertion holes 32 on the outward side in the radial direction and a virtual line V2 that connects inner circumferential surfaces of the pair of outer second magnet insertion holes 32 on the inward side in the radial direction.

A second convex portion 32D is provided between the second outer end portions 32A and the inner circumferential surfaces of the outer second magnet insertion holes 32 on the inward side in the radial direction.

In the outer circumferential surfaces of the outer second magnet insertion holes 32 on the outward side in the radial direction, a first contact portion 32E is provided between the outer end portion of the second inner end portions 32B in the radial direction and a first intersection V51 crossing the virtual line V5. In the embodiment, while the outer circumferential surfaces of the outer second magnet insertion holes 32 on the outward side in the radial direction are provided in a smooth arc shape, the configuration is not limited thereto. In the outer circumferential surface of the outer second magnet insertion holes 32 on the outward side in the radial direction, the first contact portion 32E may protrude toward a central axis C on the inward side in the radial direction.

The second outer end portions 32A and the second inner end portions 32B smoothly connect the outer circumferential surfaces of the outer second magnet insertion holes 32 on the outward side in the radial direction and the inner circumferential surfaces of the outer second magnet insertion holes 32 on the inward side in the radial direction. Specifically, the pair of second inner end portions 32B project in the directions facing each other in the circumferential direction. For this reason, a thickness of the first center rib 32C in the circumferential direction is thickest on the virtual line V1 and the virtual line V2, and gradually thinned from the virtual line V1 toward the inward side in the radial direction. In addition, a thickness of the first center rib 32C in the circumferential direction is gradually thinned from the virtual line V2 toward the outward side in the radial direction. That is, a thickness of the first center rib 32C in the circumferential direction is thinnest in the central portion in the radial direction from the virtual line V1 to the virtual line V2. In other words, a distance between the pair of second inner end portions 32B in the circumferential direction is closest at the central portion from the virtual line V1 to the virtual line V2 in the radial direction.

The inner second magnet insertion hole 33 is provided on the inward side of the outer second magnet insertion holes 32 in the radial direction. The pair of inner second magnet insertion holes 33 are provided in the circumferential direction with a second center rib 33C extending in the radial direction sandwiched therebetween. The pair of inner second magnet insertion holes 33 are formed in an arc shape having the same curvature and arc center as the first magnet insertion hole 31 and the outer second magnet insertion holes 32 when seen in the axial direction.

In the end portions of the inner second magnet insertion hole 33, a third outer end portion 33A is provided on one end portion on the outward side in the radial direction. In the end portions of the inner second magnet insertion hole 33, a third inner end portion 33B is provided on the other end portion on the inward side in the radial direction. The second center rib 33C is provided on the inward side of the pair of third inner end portions 33B in the circumferential direction. Specifically, the second center rib 33C is provided between a virtual line V3 that connects the outer circumferential surfaces of the pair of inner second magnet insertion holes 33 on the outward side in the radial direction and a virtual line V4 that connects the inner circumferential surfaces of the pair of inner second magnet insertion holes 33 on the inward side in the radial direction.

A third convex portion 33D is provided between the third outer end portion 33A and the inner circumferential surface of the inner second magnet insertion hole 33 on the inward side in the radial direction.

In the outer circumferential surface of the inner second magnet insertion hole 33 on the outward side in the radial direction, a second contact portion 33E is provided between the end portion of the third inner end portion 33B on the outward side in the radial direction and a second intersection V52 crossing the virtual line V5. In the embodiment, while the outer circumferential surface of the inner second magnet insertion hole 33 on the outward side in the radial direction is formed in a smooth arch shape, the configuration is not limited thereto. In the outer circumferential surface of the inner second magnet insertion hole 33 on the outward side in the radial direction, the second contact portion 33E may protrude toward the central axis C on the inward side in the radial direction.

The third outer end portion 33A and the third inner end portion 33B smoothly connect the outer circumferential surface of the inner second magnet insertion hole 33 on the outward side in the radial direction and the inner circumferential surface of the inner second magnet insertion hole 33 on the inward side in the radial direction. Specifically, the pair of third inner end portions 33B protrude in directions facing each other in the circumferential direction. For this reason, a thickness of the second center rib 33C in the circumferential direction is thickest on the virtual line V3 and the virtual line V4, and gradually thinned from the virtual line V3 toward the inward side in the radial direction. In addition, a thickness of the second center rib 33C in the circumferential direction is gradually thinned from the virtual line V4 toward the outward side in the radial direction. That is, a thickness of the second center rib 33C in the circumferential direction is thinnest at the central portion in a radial direction from the virtual line V3 to the virtual line V4. In other words, a distance between the pair of third inner end portions 33B in the circumferential direction is closest at the central portion from the virtual line V3 to the virtual line V4 in the radial direction.

In order to prevent a magnetic flux short circuit and in order to increase a strength, an increase in thickness of the first center rib 32C or the second center rib 33C in the radial direction is general. However, in the embodiment, when the rotor core 21 is compressed by the annular member 8 (to be described below) toward the inward side in the radial direction, the thickness is intentionally thinned in the radial direction from the virtual line V1 to the virtual line V2 such that the first center rib 32C is not buckled. Similarly, when the rotor core 21 is compressed toward the inward side in the radial direction by the annular member 8 (to be described below), the thickness in the radial direction from the virtual line V3 to the virtual line V4 is intentionally thinned such that the second center rib 33C is not buckled.

The end rib 40 is provided on an outward side of the first end portion 31A, the second outer end portions 32A and the third outer end portion 33A in the radial direction which are located on the outward side of the magnet insertion holes 25 in the radial direction. The end rib 40 has a first end rib 41, a second end rib 42, and a third end rib 43. The thicknesses of the first end rib 41, the second end rib 42, and the third end rib 43 in the radial direction are the same with each other when seen in the axial direction.

The first end rib 41 is provided between the outer circumferential surface of the rotor core 21 and the first end portion 31A of the first magnet insertion hole 31. The second end rib 42 is provided between the outer circumferential surface of the rotor core 21 and the second outer end portions 32A of the outer second magnet insertion holes 32. The third end rib 43 is provided between the outer circumferential surface of the rotor core 21 and the third outer end portions 33A of the inner second magnet insertion holes 33.

Since the annular member 8 is mounted on the rotor core 21 (to be described below), compressive stress with respect to the first end rib 41, the second end rib 42, and the third end rib 43 is applied in the radial direction.

As shown in FIG. 2, the shaft through-hole 45 is provided on the inward side of the magnet insertion holes 25 in the radial direction. The shaft through-hole 45 passes through the rotor core 21 in the axial direction. The shaft through-hole 45 is provided coaxially with the axis C. The shaft 5 is inserted into the shaft through-hole 45 (see FIG. 1). The shaft 5 is press-fitted and fixed to, for example, the shaft through-hole 45.

As shown in FIG. 2, the weight reducing part 46 is provided between the magnet insertion holes 25 and the shaft through-hole 45 in the radial direction. The weight reducing part 46 functions as a flux barrier. The weight reducing part 46 passes through the rotor core 21 in the axial direction. The weight reducing part 46 is provided between the magnet insertion holes 25 neighboring in the circumferential direction. The weight reducing part 46 is formed in a triangular shape having an apex portion on the outward side in the radial direction when seen in the axial direction. When the weight reducing part 46 is provided, the weight of the rotor core 21 can be reduced.

A penetration member 47 is formed to pass through the weight reducing part 46. The weight reducing part 46 may be filled with a resin material.

<End Surface Plate>

The end surface plate 23 is disposed on both end portions of the rotor core 21 in the axial direction. The end surface plate 23 may cover at least the plurality of magnet insertion holes 25. The end surface plate 23 abuts the outer end surface of the rotor core 21 in the axial direction. The end surface plate 23 is press-fitted and fixed to the shaft 5. As shown in FIG. 4, both ends of the penetration member 47 are fixed to the end surface plates 23 by fixing members 48. In the embodiment, while the fixing members 48 are formed as members such as screws screwed to the penetration member 47, there is not limitation thereto. The fixing members 48 may fix both ends of the penetration member 47 to the end surface plates 23. The fixing members 48 may be configured to be fixed to the end surface plate 23 by caulking both end portions of the penetration member 47.

<Magnet>

The magnet 22 is formed of a permanent magnet. The magnet 22 has a first magnet 221, a second magnet 222, and a third magnet 223.

A gap generated between the magnet 22 and the magnet insertion holes 25 is filled with a resin material.

The first magnet 221 is press-fitted into the first magnet insertion hole 31. The first magnet 221 is formed in an arc shape having the same curvature and arc center as the first magnet insertion hole 31. In a state in which the first magnet 221 is inserted into the first magnet insertion hole 31, both end portions of the first magnet 221 in the circumferential direction on the outward side come into contact with the first convex portions 31D.

The second magnet 222 is press-fitted into the outer second magnet insertion holes 32. The pair of second magnets 222 are provided to sandwich the first center rib 32C. A void is provided between the second magnet 222 and the first center rib 32C. That is, the second magnet 222 and the second inner end portions 32B are separated from each other.

In the following description, in the second magnet 222, a side surface facing the second end rib 42 may be referred to as "one end portion," and in the second magnet 222, a side surface facing the first center rib 32C may be referred to as "the other end portion."

The second magnet 222 is formed in an arc shape having the same curvature and arc center as the outer second magnet insertion holes 32. The second magnet 222 is thicker than the first magnet 221. In a state in which the second magnet 222 is inserted into the outer second magnet insertion holes 32, one end portion of the second magnet 222 comes in contact with the second convex portion 32D.

In a state in which the second magnet 222 is inserted into the outer second magnet insertion holes 32, among the circumferential surface of the second magnet 222 on the outward side in the radial direction, an area from the other end portion of the second magnet 222 to the outer circumferential surface facing the first intersection V51 on the outward side in the radial direction comes in contact with the first contact portion 32E of the second outer magnet insertion hole 32.

The third magnet 223 is press-fitted into the inner second magnet insertion hole 33. The pair of third magnets 223 are provided to sandwich the second center rib 33C. A void is provided between the third magnet 223 and the second center rib 33C. That is, the third magnet 223 and the third inner end portion 33B are separated from each other.

In the following description, a side surface of the third magnet 223 facing the third end rib 43 may be referred to as "one end portion," and a side surface of the third magnet 223 facing the second center rib 33C may be referred to as "the other end portion."

The third magnet 223 is formed in an arc shape having the same curvature and arc center as the inner second magnet insertion hole 33. The third magnet 223 is thicker than the second magnet 222. In a state in which the third magnet 223 is inserted into the inner second magnet insertion hole 33, the end portion of the third magnet 223 in the circumferential direction on the outward side comes into contact with the third convex portion 33D.

In a state in which the third magnet 223 is inserted into the inner second magnet insertion hole 33, among the circumferential surface of the third magnet 223 on the outward side in the radial direction, an area from the other end portion of the third magnet 223 to the outer circumferential surface facing the second intersection V52 on the outward side in the radial direction comes in contact with the second contact portion 33E of the inner second magnet insertion hole 33.

<Annular Member>

As shown in FIG. 2 and FIG. 3, the annular member 8 is formed in an annular shape about the axis C. The annular member 8 is provided on the outer circumferential surface of the rotor core 21 and covers the rotor core 21 from the outward side in the radial direction. The annular member 8 functions as a compression part configured to apply a load to the rotor core 21 from the outward side in the radial direction toward the inward side in the radial direction.

The annular member 8 is a non-magnetic material and may be formed of a material having a low conductivity. Specifically, the annular member 8 may be formed of a metal material such as stainless steel or the like, or a synthetic fiber material such as CFRP or the like. Since the annular member 8 is desirable to have tensile strength higher than that of the electromagnetic steel plates, the annular member 8 is particularly preferably formed of a synthetic fiber material such as CFRP or the like. A length dimension of the annular member 8 in the axial direction is the same as that of the rotor core 21 in the axial direction.

The annular member 8 is fixed to the outer circumferential surface of the rotor core 21 in a state in which compressive stress is applied to the rotor core 21 in the radial direction. Specifically, the compressive stress is applied to the rotor core 21 by press-fitting the annular member 8 to the rotor core 21. By providing the annular member 8, it is possible to obtain effects of stress attenuation by adding a margin allowance in negative stress by pre-compression and parallelizing a shoulder and a spring of the stress. Further, since the pre-compression effect is proportional to the fastening margin, the thickness of the first center rib 32C and the second center rib 33C in the radial direction is inversely proportional to the fastening margin. In addition, by providing the annular member 8, compressive stress can be applied to the second magnet 222 and the third magnet 223, which have the largest centrifugal stress.

<Reinforcement Member>

Next, the reinforcement part provided in the rotor core 21 will be described.

The reinforcement part is provided between the shaft through-hole 45 and the first magnet insertion hole 31 located on the outermost side in the radial direction. The reinforcement part has a function of improving a strength of the rotor core 21.

The penetration member 47 is included in the reinforcement part. Since the pair of end surface plates 23 are fixed to both ends of the penetration member 47, the rotor core 21 can be reinforced toward the inward side in the axial direction.

The resin material filled in the weight reducing part 46 is included in the reinforcement part. The weight reducing part 46 itself can be reinforced by solidifying the inside of the weight reducing part 46 filled with the resin material.

The resin material filled between the magnet 22 and the magnet insertion holes 25 functions as the reinforcement part. The rotor core 21 can be reinforced by solidifying the space between the magnet 22 and the magnet insertion holes 25 filled with the resin material.

The first center rib 32C and the second center rib 33C are included in the reinforcement part. When the load is applied to the rotor core 21 by the annular member 8, the first magnet 221 is pressed in the axial direction. When the first magnet 221 is pressed in the axial direction, a portion surrounded by the virtual line V5 and the second magnet 222 is further compressed. In the portion surrounded by the virtual line V5 and the second magnet 222, since the first center rib 32C and the second center rib 33C are further compressed, in comparison with the structure in which the center rib is not provided, a strength of the rotor 4 can be improved.

The first contact portion 32E and the second contact portion 33E are included in the reinforcement part. As described above, when the load is applied to the rotor core 21 by the annular member 8, the portion surrounded by the virtual line V5 and the second magnet 222 is further compressed. Specifically, the first contact portion 32E is pressed from the other end portion of the second magnet 222 to the outer circumferential surface facing the first intersection V51 on the outward side in the radial direction, among the circumferential surface of the second magnet 222 on the outward side in the radial direction. In addition, the second contact portion 33E is pressed from the other end portion of the third magnet 223 to the outer circumferential surface facing the second intersection V52 on the outward side in the radial direction, among the circumferential surface of the third magnet 223 on the outward side in the radial direction.

In the portion surrounded by the virtual line V5 and the second magnet 222, since the first contact portion 32E and the second contact portion 33E are further compressed, in comparison with the structure in which the first contact portion 32E or the second contact portion 33E is not provided, a strength of the rotor 4 can be improved.

(Method of Manufacturing Rotor)

Next, a method of manufacturing the above-mentioned rotor 4 will be described.

The method of manufacturing the rotor 4 includes a magnet insertion process and an annular member disposition process.

In the magnet insertion process, the magnets 22 are inserted into the magnet insertion holes 25 of the rotor core 21, respectively.

In the annular member disposition process, in a state in which compressive stress is applied to the rotor core 21 in the radial direction, the annular member 8 is disposed on the outer circumferential portion of the rotor core 21. In the embodiment, in the annular member disposition process, since the annular member 8 is press-fitted to the rotor core 21, the annular member 8 is fixed to the outer circumferential surface of the rotor core 21. Specifically, an inner diameter of the annular member 8 before mounting on the rotor core 21 is formed to be smaller than an outer diameter of the rotor core 21. When the annular member 8 is mounted on the rotor core 21, the annular member 8 is spread toward the outward side in the radial direction, and the rotor core 21 is inserted into the inner circumferential portion of the annular member 8 in the axial direction. In the annular member disposition process, the annular member 8 is set such that the compressive stress applied to the rotor core 21 upon mounting of the rotor core 21 becomes a predetermined value.

(Effects)

In the embodiment, since the rotor core 21 includes the reinforcement part, a strength of the rotor 4 can be improved. The rotating electric machine 1 has the rotor core 21 including the reinforcement part. Therefore, according to the embodiment, it is possible to provide the rotor 4 and the rotating electric machine 1 that are capable of improving a strength and being stably used even upon high speed rotation.

In the embodiment, since the weight reducing part 46 is provided in the rotor core 21, the weight of the rotor core 21 can be reduced, and the rotor core 21 can also be stably used even upon high speed rotation of the rotor 4. In addition, since the reinforcement part is disposed in the weight reducing part 46, a strength of the rotor core 21 can be improved.

In the embodiment, the reinforcement part (the penetration member 47) is fixed by the end surface plates 23 that sandwich both end portions of the rotor core 21 in the axial direction. For this reason, a strength of the rotor core 21 can be improved without exerting an influence on the magnetic field.

In the embodiment, the resin material is included in the reinforcement part. Since the magnet insertion holes 25 or the weight reducing part 46 is easily filled with the resin material, the rotor can be conveniently reinforced.

In the embodiment, the first center rib 32C and the second center rib 33C are included in the reinforcement part. Since the strength of the rotor core 21 can be improved by the first center rib 32C and the second center rib 33C and the magnet can be supported by the first center rib 32C and the second center rib 33C, the rotor 4 is easily rotated at a high speed.

In the embodiment, the pair of second magnets 222 are provided to sandwich the first center rib 32C, and the pair of third magnets 223 are provided to sandwich the second center rib 33C. As a general rule, it is effective to provide the center rib that supports the magnet 22 in order to increase the rotation speed of the rotor 4.

However, when the center rib is provided large (thick) over the radial direction or the circumferential direction, a magnetic flux short circuit of the magnet 22 may occur, and the torque may be decreased. When the center rib is provided large (or thick) throughout the rotor core in the radial direction or the circumferential direction, while the stress of the centrifugal force in the circumferential direction becomes stronger, a leakage flux of the magnet becomes larger. Meanwhile, when the center rib is provided small (thin) over the radial direction or the circumferential direction, since inductance of a d shaft is increased, the output of the rotating electric machine 1 may be decreased.

In the embodiment, from a viewpoint of minimizing occurrence of the magnetic flux short circuit and minimizing reduction in rotary torque, the first magnet insertion hole 31 is not provided with the center rib.

In the embodiment, a compression part configured to apply a load to the rotor core 21 from an outward side in the radial direction toward an inward side in the radial direction is provided. High speed rotation of the rotor 4 can be achieved by compressing the rotor core 21 using the compression part while securing a strength of the rotor core 21 by the reinforcement part.

In the embodiment, the reinforcement part includes the first contact portion 32E and the second contact portion 33E with which the second magnet 222 and the third magnet 223 are in contact when the load from the compression part is applied to the rotor core 21. In comparison with the case in which the magnet insertion hole having a reduced clearance from the magnet 22 is provided in advance, a work of inserting the magnet 22 into the magnet insertion holes 25 becomes easier. In addition, since compression deformation occurs between the rotor core 21, the first contact portion 32E and the second contact portion 33E due to the compression part, the second magnet 222 and the third magnet 223 are fixed, and high speed rotation of the rotor 4 is achieved.

In the embodiment, the second convex portion 32D and the third convex portion 33D come into contact with one end portions of the second magnet 222 and the third magnet 223 press-fitted into the second magnet insertion holes 35 (the outer second magnet insertion holes 32 and the inner second magnet insertion hole 33). Since the second convex portion 32D and the third convex portion 33D come into contact with the one end portions of the second magnet 222 and the third magnet 223, voids can be provided between the second outer end portions 32A and one end portion of the second magnet 222 and between the third outer end portion 33A and one end portion of the third magnet 223, and a leakage magnetic field can be reduced in size.

In the embodiment, the other end portion of the second magnet 222 is separated from the first center rib 32C. That is, a void is provided between the other end portion of the second magnet 222 and the second inner end portions 32B. Similarly, the other end portion of the third magnet 223 is separated from the second center rib 33C. That is, a void is provided between the other end portion and the third magnet and the third inner end portion 33B. Since the void functions as a flux barrier, performance of the rotor 4 can be improved.

In the embodiment, since the arc-shaped magnet 22 is provided, in comparison with the case in which a linear magnet is provided, a thickness and a length of the first center rib 32C and the second center rib 33C in the circumferential direction (a distance from the virtual line V1 to the virtual line V2 or from the virtual line V3 to the virtual line V3 in the radial direction) can be relatively thinned. In addition, there is an advantage that the magnet 22 is not crushed by the centrifugal force using the arc-shaped magnet 22.

In the embodiment, the thickness of each magnet in the radial direction is thicker in the second magnet 222 than in the first magnet 221, and thicker in the third magnet 223 than in the second magnet 222 (the thickness in the radial direction: the first magnet 221<the second magnet 222<the third magnet 223). The thickness of the second magnet 222 in the radial direction is equal to the length between the virtual line V1 and the virtual line V2 in the radial direction. The thickness of the third magnet 223 in the radial direction is equal to the length between the virtual line V3 and the virtual line V4 in the radial direction. Further, a permeance modulus decreases in the reverse order of the thicknesses of the magnets in the radial direction (the permeance modulus: the first magnet 221>the second magnet 222>the third magnet 223).

In the rotor core 21, a magnetic flux is concentrated and demagnetizing toughness is improved from the inward side toward the outward side in the radial direction. For this reason, the thicknesses of the magnets in the radial direction can become the first magnet 221<the second magnet 222<the third magnet 223. Originally, while the first magnet 221 with the thinnest thickness in the radial direction works in a demagnetizing direction, in the embodiment, since the thickness of the second magnet 222 and the third magnet 223 in the radial direction is greater than the thickness of the first magnet 221 in the radial direction, the magnetic flux of the second magnet 222 and the third magnet 223 can supplement the magnetic flux of the first magnet 221.

(Other Variants)

Hereinafter, variants of the embodiment will be described.

In the embodiment, the configuration in which the thicknesses of the first end rib 41, the second end rib 42, and the third end rib 43 in the radial direction are the same as each other when seen in the axial direction has been described, there is no limitation thereto. The thicknesses of the first end rib 41, the second end rib 42, and the third end rib 43 in the radial direction may be different from each other.

In the above-mentioned embodiment, while the example in which the rotating electric machine 1 is a traveling motor mounted on a vehicle such as a hybrid automobile, an electric automobile, or the like, has been exemplarily described, there is no limitation thereto. For example, the rotating electric machine 1 may be a rotating electric machine (including a generator) other than a motor for power generation, or motors for other purposes, and motors for vehicles.

In the above-mentioned embodiment, while the configuration in which the penetration member 47 as the reinforcement part is disposed in the weight reducing part 46 has been described, there is no limitation thereto. A configuration in which the weight reducing part 46 is filled with the resin material only and the penetration member 47 is not disposed in the weight reducing part 46 may be provided.

In the above-mentioned embodiment, while the configuration in which the rotor core 21 has the end surface plates 23 on both end portions in the axial direction and the penetration member 47 as the reinforcement part is fixed to the end surface plates 23 has been described, there is no limitation thereto. The end surface plates 23 may be provided on both end portions of the rotor core 21 in the axial direction. For example, in the configuration in which the penetration member 47 is not disposed in the weight reducing part 46, the end surface plates 23 may be fixed to both end portions of the rotor core 21 in the axial direction by the fixing members 48.

In the above-mentioned embodiment, while the configuration in which the penetration member 47, the first center rib 32C, the second center rib 33C, the first contact portion 32E, and the second contact portion 33E are included in the reinforcement part has been described, there is no limitation thereto. The reinforcement part may be provided between the shaft through-hole 45 and the first magnet insertion hole 31 located on the outermost side in the radial direction. In addition, all the penetration member 47, the first center rib 32C, the second center rib 33C, the first contact portion 32E, and the second contact portion 33E may not have to be provided as the reinforcement part. The reinforcement part may be an assembly of any one reinforcement part of the penetration member 47, the first center rib 32C, the second center rib 33C, the first contact portion 32E and the second contact portion 33E, and the plurality of reinforcement part that are selected arbitrarily.

In the above-mentioned embodiment, while the configuration in which the pair of outer second magnet insertion holes 32 are arranged in the circumferential direction to sandwich the first center rib 32C extending in the radial direction has been described, there is no limitation thereto. The outer second magnet insertion holes 32 may not have the first center rib 32C extending in the radial direction. In this case, the outer second magnet insertion holes 32 are provided along the virtual line V1 and the virtual line V2. When the first center rib 32C is not provided, the second magnets 222 may be provided in an arc shape that can be press-fitted into the outer second magnet insertion holes 32.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A rotor comprising:
a rotor core in which a shaft through-hole and a magnet insertion hole that form a plurality of layers in a radial direction toward a central axis of the shaft through-hole are formed;
a magnet press-fitted into the magnet insertion hole, and
a compression part configured to apply a load to the rotor core from an outward side in the radial direction toward an inward side in the radial direction,
wherein the rotor core includes a reinforcement part between the shaft throughhole and a first magnet insertion hole disposed on outermost side in the radial direction,
wherein, among the magnet insertion hole comprising the plurality of layers, a pair of second magnet insertion holes located on an inward side of the first magnet insertion hole in the radial direction are arranged in a circumferential direction to sandwich a center rib extending in the radial direction,
wherein the reinforcement part includes the center rib, and wherein the reinforcement part includes a contact portion, with which the magnet comes into contact, when a load from the compression part is applied to the rotor core.

2. The rotor according to claim 1, wherein the rotor core has a weight reducing part passing through in an axial direction, and
the reinforcement part is disposed inside the weight reducing part.

3. The rotor according to claim 2, wherein the rotor core has end surface plates on both end portions in the axial direction, and
the reinforcement part includes a member that passes through the weight reducing part and that is fixed to the end surface plates.

4. The rotor according to claim 1, wherein the reinforcement part includes a resin material.

5. The rotor according to claim 1, comprising a compression part configured to apply a load to the rotor core from an outward side in the radial direction toward an inward side in the radial direction.

6. The rotor according to claim 1, wherein the rotor core has a convex portion extending outward in the radial direction in a circumferential surface of the magnet insertion hole on an inward side in the radial direction,
the convex portion comes into contact with one end portion of the magnet pressfitted into the second magnet insertion holes, and
the contact portion comes into contact with other end portion of the magnet press-fitted into the second magnet insertion holes.

7. The rotor according to claim 6, wherein the other end portion of the magnet and the center rib are separated from each other.

8. The rotor according to claim 1, wherein the magnet insertion hole is provided in an arc shape protruding toward a central axis of the rotor core, and the magnet is provided in an arc shape.

9. A rotating electric machine comprising:
the rotor according to claim 1; and
a stator disposed on an outward side in the radial direction from the rotor while having a gap therebetween.

* * * * *